United States Patent
Samuel et al.

(10) Patent No.: US 12,024,987 B2
(45) Date of Patent: Jul. 2, 2024

(54) SYSTEMS AND METHODS OF PROVIDING OPERATIONAL SURVEILLANCE, DIAGNOSTICS AND OPTIMIZATION OF OILFIELD ARTIFICIAL LIFT SYSTEMS

(71) Applicant: Schlumberger Technology Corporation, Sugar Land, TX (US)

(72) Inventors: Prince Mathew Samuel, Sugar Land, TX (US); Abhishek Sharma, Houston, TX (US); Anand Sankar Aananthakrishnan, Singapore (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 12 days.

(21) Appl. No.: 17/757,717

(22) PCT Filed: Dec. 9, 2020

(86) PCT No.: PCT/US2020/063876
§ 371 (c)(1),
(2) Date: Jun. 20, 2022

(87) PCT Pub. No.: WO2021/126613
PCT Pub. Date: Jun. 24, 2021

(65) Prior Publication Data
US 2022/0356796 A1    Nov. 10, 2022

Related U.S. Application Data

(60) Provisional application No. 62/951,978, filed on Dec. 20, 2019.

(51) Int. Cl.
E21B 43/12     (2006.01)
E21B 43/30     (2006.01)
G06V 10/94     (2022.01)

(52) U.S. Cl.
CPC ............ *E21B 43/121* (2013.01); *E21B 43/30* (2013.01); *G06V 10/95* (2022.01)

(58) Field of Classification Search
CPC ......... E21B 43/121; E21B 43/13; E21B 44/00
See application file for complete search history.

(56) References Cited

U.S. PATENT DOCUMENTS

| 4,932,253 A | 6/1990 | McCoy |
| 2003/0063013 A1* | 4/2003 | Jin .......................... E21B 7/046 340/853.3 |

(Continued)

FOREIGN PATENT DOCUMENTS

| WO | 2018165352 A1 | 9/2018 |
| WO | 2019222129 A1 | 11/2019 |

OTHER PUBLICATIONS

Search Report and Written Opinion of International Patent Application No. PCT/US2020/063876 dated Feb. 23, 2021, 11 pages.
(Continued)

*Primary Examiner* — Kristyn A Hall
(74) *Attorney, Agent, or Firm* — Alec McGinn

(57) ABSTRACT

Systems and methods are provided for monitoring and/or controlling operations of an artificial lift system of a production well, which employ a gateway device disposed at a wellsite corresponding to the well, and at least one remote cloud-computing system operably coupled to the gateway device. The gateway device includes at least one first interface to the artificial lift system, at least one second interface to the at least one cloud-computing system, and a processor configured to execute a first application that acquires data produced by the artificial lift system and communicated to the gateway device via the first interface.

23 Claims, 8 Drawing Sheets

(56) References Cited

U.S. PATENT DOCUMENTS

| | | |
|---|---|---|
| 2007/0175633 A1 | 8/2007 | Kosmala et al. |
| 2014/0244552 A1 | 8/2014 | Liu et al. |
| 2017/0076209 A1 | 3/2017 | Sisk et al. |
| 2017/0285623 A1 | 10/2017 | Figoli et al. |
| 2018/0300665 A1 | 10/2018 | Maturana et al. |
| 2019/0204467 A1 | 7/2019 | Curt et al. |

OTHER PUBLICATIONS

Schlumberger, "Lift IQ—Production life cycle management service", May 1, 2017, retrieved from the Internet: [https://www.slb.com/-/media/files/al/product-sheet/lift-iq-ps.ashx' retrieved on Nov. 11, 2023, 2 pages.

* cited by examiner

SYSTEMS AND METHODS OF PROVIDING OPERATIONAL SURVEILLANCE, DIAGNOSTICS AND OPTIMIZATION OF OILFIELD ARTIFICIAL LIFT SYSTEMS

CROSS-REFERENCE TO RELATED APPLICATION(S)

This application is a National Stage Entry of International Patent Application No. PCT/US2020/063876, filed on Dec. 9, 2020, which claims priority to U.S. Provisional Patent Appl. No. 62/951,978, filed on Dec. 20, 2019, herein incorporated by reference in its entirety.

FIELD

The present disclosure relates to operational surveillance, diagnostics, and optimization of oilfield artificial lift systems, such as rod pump systems.

BACKGROUND

In many oilfields around the world, a large number of wells have been drilled and put into production with various artificial lift techniques, including rod pump systems (which are also referred to as sucker rod systems). A typical rod pump system employs a number of interconnected rods which are referred to as a rod string. The rod string is coupled to an actuating device at the surface. A subsurface pump is coupled to the rod string at a desired location in the well. The actuating device is typically embodied by a pump jack of the walking beam type which is coupled to the rod string by a rod hanger. The actuating device imparts reciprocating motion to the rod string which causes the pump to capture and lift formation fluids to the surface. The actuating device is driven by a prime mover, which is typically embodied by an electric motor or internal combustion engine. The prime mover typically delivers high-speed, low-torque rotational power to a gear reducer, which converts that rotational power into low-speed, high-torque rotational power supplied to the pump jack. The pump jack converts the rotational power output by the gear reducer into reciprocating motion that lifts and lowers the rod string connected to the subsurface pump. The operation of the prime mover is typically controlled by a controller (referred to herein as a rod pump controller), which is typically embodied by a computer-based system or other electronic control device.

In deep wells, the rod string can experience considerable stretch, distributed mass, etc., and the motion at the pump end may be radically different from that imparted at the surface. In order to better inform the operation of the rod pump system, some conventional rod pump systems include one or more sensor systems to gather information about one or more states of the rod pump system. Some of these sensor systems utilize a load cell or dynamometer which measures the tensile load of the rod string. The dynamometer is an instrument which records a curve, typically referred to as a dynacard or dynagraph, of load versus displacement for the rod string. The shape of this curve reflects the operational conditions of the rod pump system over the pumping action (or strokes) of the system. Other sensor systems use a shockwave-based system which measures fluid height in a casing surrounding the rod string and production fluid tubing. Some other sensor systems may measure motor current, voltage, and/or instant RPM to evaluate the torque generated by the motor. The geometry of the rod string and the motor torque may then be used to evaluate the tensile loading of the rod string. In conventional systems, the rod pump system state information gathered by the sensor system over time can be analyzed and interpreted by manual visual inspection or by automated apparatus and procedures in order to monitor the performance characteristics of the rod pump system over time.

In the current environment, operators are aggressively looking to increase production with operational efficiency gains in oilfield artificial lift systems, including rod pump systems. Such systems collect a large amount of data over time and it can be difficult to ascertain meaningful insight into the performance of a particular artificial pump system over time and manage and optimize the operations of the particular oilfield artificial lift system and the production of fluids by such system.

SUMMARY

Systems and methods are provided for monitoring and/or controlling operations of an artificial lift system of a production well, which employ a gateway device disposed at a wellsite corresponding to the well, and at least one cloud-computing system disposed remotely from the wellsite and operably coupled to the gateway device. The gateway device comprises at least one first interface that is operably coupled to the artificial lift system, at least one second interface that is operably coupled to the at least one cloud-computing system, and a processor configured to execute a first application that acquires data (i.e., high frequency data) produced by the artificial lift system and communicated to the gateway device via the at least one first interface. The first application includes a computational module that processes the acquired data to detect and classify operational events from such data. The cloud-computing system is configured to execute a second application that receives event data communicated from the gateway device, wherein the event data characterizes the operational events detected and classified by the computational module. The event data can be stored and accessed by authorized users of the cloud-computing system for remote surveillance of operation of the artificial lift system at the wellsite.

In embodiments, the artificial lift system can include a controller and at least one sensor disposed at the wellsite, and the data produced by the artificial lift system and communicated to the gateway device via the at least one first interface of the gateway device can include data produced by the controller and the at least one sensor.

In embodiments, the at least one cloud-computing system can further include a system operably coupled to the gateway device by at least one secure communication channel to provide for remote management of the gateway device.

In embodiments, the remote management of the gateway device can include a number of management functions selected from the group including: onboarding the gateway device and optionally one or more devices operably coupled thereto, decommissioning the gateway device and optionally one or more devices operably coupled thereto, monitoring the status of the gateway device and optionally one or more devices operably coupled thereto, remotely configuring the gateway device and optionally one or more devices operably coupled thereto, remotely updating software/firmware of the gateway device and optionally one or more devices operably coupled thereto; and sending commands to the gateway device and optionally one or more devices operably coupled thereto.

In embodiments, the remote management of the gateway device can include secure provisioning of the gateway device utilizing a trusted platform chip that is part of the gateway device.

In embodiments, the remote management of the gateway device can include secure over-the-air update of software or firmware of the gateway device.

In embodiments, the remote management of the gateway device can include secure over-the-air update of operating system software and application software of the gateway device.

In embodiments, the remote management of the gateway device can include secure over-the-air update for installation or update of the first application on the gateway device.

In embodiments, the remote management of the gateway device can include secure over-the-air update of the computational module. The update of the computational module can be based on historical operational data.

In embodiments, the second application that executes on the at least one cloud-computing system can be further configured to present or display an alert corresponding to the event data received from the gateway device.

In embodiments, the second application that executes on the at least one cloud-computing system can be further configured to enable user interaction that specifies at least one command for corrective action in response to an alert and communication of command data representing the at least one command to the gateway device. Furthermore, the first application of the gateway device can be further configured to receive the command data and relay or translate the command data for supply to the artificial lift system via the first interface of the gateway device.

In embodiments, the first application of the gateway device can be further configured to include an autonomous control program. The autonomous control program can generate (without human involvement) command data representing a command for correction action given an operational event as output by the computational module, relay or translate such command data for supply to the artificial lift system via the first interface of the gateway device, and communicate such command data to the at least one cloud-computing system via the at least one second interface of the gateway device.

In embodiments, the at least one cloud-computing system can include a system that is operably coupled to the gateway device by at least one secure communication channel therebetween to provide for remote management of the gateway device, which includes secure over-the-air update for installation or update of the autonomous control program as part of the first application on the gateway device.

In embodiments, the second application that executes on the at least one cloud-computing system can be further configured to allow user review of the commands generated by the autonomous control program and optionally review of underlying alert and event data and operational data.

In embodiments, the computational module can embody data analytics, machine learning and/or artificial intelligence.

In embodiments, the computational module can employ real-time data stream analytics to analyze changing behavior of data generated by the artificial lift system at the wellsite. In embodiments, such data stream analytics can be configured to process a stream or batch of data generated by the artificial lift system over a sampling period to detect and/or predict operational events from the data. In embodiments, such data stream analytics is configured to perform multivariate anomaly detection of anomalies or failures of the artificial lift system from the data.

In embodiments, the at least one first interface of the gateway device can include at least one wired communication interface and at least one wireless communication interface.

In embodiments, the at least one second interface of the gateway device can include at least one of a cellular data communication interface and a satellite data communication interface.

In embodiments, the artificial lift system can be a rod pump system that includes a controller and at least one sensor disposed at the wellsite that produces data acquired at the gateway device and processed by the computational module of the gateway device. The at least one sensor can include a load cell or dynamometer which measures rod string tensile loading of the rod pump system.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

The subject disclosure is further described in the detailed description which follows, in reference to the noted plurality of drawings by way of non-limiting examples of the subject disclosure, in which like reference numerals represent similar parts throughout the several views of the drawings, and wherein.

DETAILED DESCRIPTION

Figure 1:
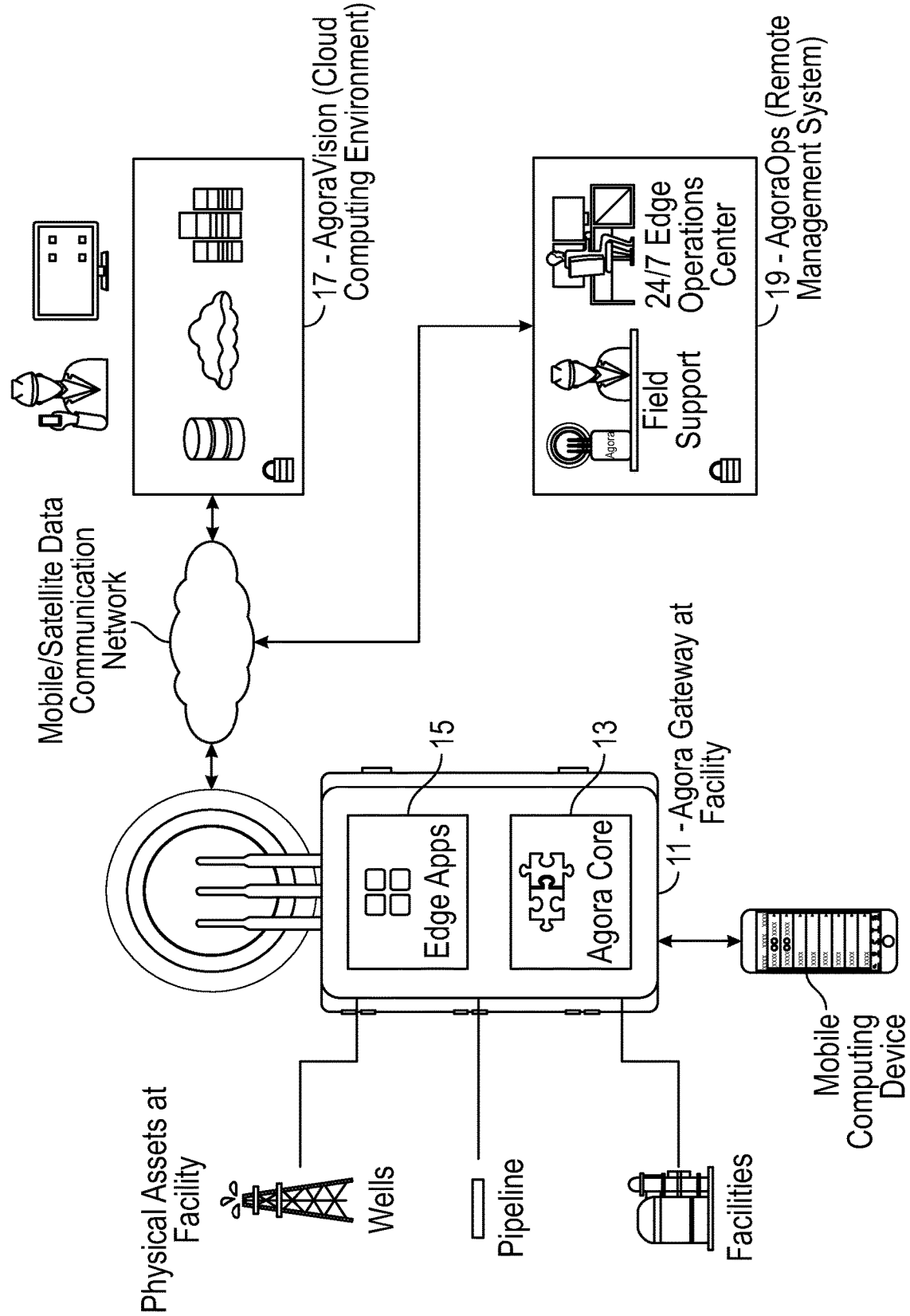
FIG. 1 is a schematic diagram of a distributed computing platform for operational surveillance, diagnostics, and optimization of oilfield facilities.

The particulars shown herein are by way of example and for purposes of illustrative discussion of the embodiments of the subject disclosure only and are presented in the cause of providing what is believed to be the most useful and readily understood description of the principles and conceptual aspects of the subject disclosure. In this regard, no attempt is made to show structural details in more detail than is necessary for the fundamental understanding of the subject disclosure, the description taken with the drawings making apparent to those skilled in the art how the several forms of the subject disclosure may be embodied in practice. Furthermore, like reference numbers and designations in the various drawings indicate like elements.

The present disclosure provides systems and methods that employ a distributed computing platform for operational surveillance, diagnostics, and optimization of oilfield artificial lift systems, including rod pump systems. The distributed computing platform can be configured to perform such operational surveillance, diagnostics and optimization of oilfield artificial lift systems using fast loop control where a combination of physics and data driven workflows allows operator users to optimize production from a well and focus on problem wells in a proactive manner.

The distributed computing platform can be configured to interface to a variety of sensor instrumentation used in oilfield artificial lift systems and implement various communication protocols to connect to such sensor instrumentation, which allows for monitoring, diagnostics, and automated control of wells. Sensor data output by such sensors can be collected and processed by a gateway located at the wellsite in real-time. Data analytics and/or machine learning and/or artificial intelligence can be used to analyze the sensor data to aid in optimizing performance of the artificial lift system and offer preventative maintenance to improve operational life.

In embodiments, the distributed computing platform can be embodied by an open, secure, and scalable distributed computing platform referred to as the Agora Platform. The Agora Platform enables oil and gas industry operators to connect physical assets at oil and gas facilities to the digital world. Such physical assets can include equipment or sensor(s) located at facilities such as well sites, well pads, pipelines, other field facilities, oil and gas processing and storage facilities, terminals and transport hubs, and other oil and gas facilities, which are referred to as a "facility" or "facilities" herein. Data generated by a physical asset at a facility can be collected and processed at the facility and/or in a cloud computing environment to monitor operating conditions and status of the physical asset in real-time, employ data analytics and/or machine learning and/or artificial intelligence to determine or recommend updates to the operational parameters of the physical asset based on the real-time operating conditions or status, and use the updates to the operational parameters of the physical asset to control the operation of the physical asset. The physical asset(s) at the facility can be controlled remotely from commands issued by the cloud computing environment and/or from commands issued by autonomous control operations performed at the facility. The Agora Platform can be configured to utilize advanced digital technologies of Industrial Internet of Things (IIoT), edge computing, cloud computing, data analytics, machine learning and artificial intelligence to improve the operational efficiency of the physical assets, to improve the safety of workforce, and to reduce environmental impact and carbon footprint.

The architecture of the Agora Platform is divided into five distinct parts as shown in FIG. 1. These five parts include i) edge hardware 11, which is referred to as the AgoraGateway, that resides at a facility (e.g., wellsite); ii) IoT middleware 13, which is referred to as AgoraCore, executing on the AgoraGateway 11; iii) one or more edge applications 15, which are referred to as "Edge Applications" or "Edge Apps," executing on the AgoraGateway 11; iv) a cloud computing environment 17, which is referred to as AgoraVision, that is located remotely from the facilities and configured to execute one or more cloud applications that cooperate with the Edge Application(s) executing on AgoraGateway(s) 11 via data communication therebetween; and v) a remote management system 19, which is referred to as AgoraOps, that is located remotely from the facilities and configured to remotely manage one or more AgoraGateway devices 11 via data communication therebetween.

The AgoraGateway 11 is a ruggedized computing device that can be configured to deliver performance edge computing and secure data ingestion. The AgoraGateway 11 can be configured to enable real time monitoring and control of the physical asset(s) at a facility (e.g., wellsite). The AgoraGateway 11 can be configured with data analytics and/or machine learning and/or artificial intelligence to detect and classify events that reflect operational state of the physical asset(s) at the facility (e.g., wellsite) based on the real-time data generated at the facility (e.g., wellsite). The AgoraGateway 11 can also be configured for autonomous control of the physical asset(s) at a facility (e.g., wellsite) based on the events that reflect the operational state of the physical asset(s) at the facility as determined by the data analytics and/or machine learning and/or artificial intelligence.

The AgoraGateway 11 can be configured to receive, collect, and aggregate data from a variety of operational equipment (such as sensors, controllers, actuators, programmable logic controllers, remote terminal units, and supervisory control and data acquisition (SCADA) systems), prepare such data for transmission to AgoraVision 17, and transmit the data from the AgoraGateway 11 to AgoraVision 17 over a data communication network, such as a cellular data network, satellite link or other mode of available data communication as shown in FIG. 1.

The AgoraGateway 11 can be configured to interface to the remote management system AgoraOps 19 over a data communication network, such as a cellular data network, satellite link or other mode of available data communication as shown in FIG. 1. The remote management system AgoraOps 19, which can be implemented in a cloud computing environment, provides for remote monitoring and control of the AgoraGateway 11 as well as remote management of security policies and remote management (such as over-the-air updates) of AgoraCore 13 and/or one or more Edge Applications 15 that execute on the AgoraGateway 11.

The AgoraGateway 11 can be housed in a compact and rugged NEMA/IP rated enclosure for outdoor use, making it suitable for the environments at well sites and facilities. The overall packaging can also be environmentally qualified.

In embodiments, the AgoraGateway 11 can be configured with a bi-directional communication interface (which is referred to herein as "Southbound Services") to the physical asset(s) at a facility (e.g., wellsite) using either a wired communication protocol (such as a serial, Ethernet, Modbus or Open Platform Communication (OPC) protocol) or a wireless communication protocol (such as IEEE 802.11 Wi-Fi protocol, Highway Addressable Remote Transducer Protocol (HART), LoraWAN, WiFi or Message Queuing Telemetry Transport (MQTT)).

In embodiments, the AgoraGateway 11 can be configured with a bi-directional wireless communication interface (which is referred to herein as "Northbound Services") to AgoraVision 17 and to the remote management system AgoraOps 19 using a cellular modem, which enables long-range data transmission. In embodiments, the cellular modem can provide for 4G LTE data transmission capability (with 3G fallback capability) using suitable communication bands in different regions of the world. For facilities (e.g., wellsites) without a cellular signal, the bi-directional wireless communication interface to AgoraVision 17 and to the remote management system AgoraOps 19 can be provided by a bidirectional satellite link supplied by an optional external satellite communication modem (such as a BGAN modem).

In embodiments, the AgoraGateway 11 can employ an embedded processing environment (e.g., data processor and memory system) that hosts and executes AgoraCore 13 and the Edge Application(s) 15 as described herein.

In embodiments, the AgoraGateway 11 can employ both hardware-based and software-based security measures. The hardware-based security measures can involve a hardware root-of-trust established using an industry standard Trusted Platform Module (TPM) v2.0 cryptographic chip. The TPM v2.0 chip can be installed on the motherboard of the AgoraGateway 11. The software-based security measures can include operating system hardening and encryption of both buffered and transmitted data. In embodiments, the TPM v2.0 cryptographic chip can be used for device authentication and storing secrets. This chip contains a strong unforgeable identity in the form of a public-private key pair called the attestation key. This identity is used to securely identify and connect the AgoraGateway 11 to the cloud services. The attestation key stored in the TPM v2.0 cryptographic chip can be used to authenticate to AgoraVision 17 and/or the remote management system AgoraOps 19. The attestation key can be configured during manufacturing and is subsequently used for building trust during device provisioning and connecting to the AgoraGateway 11. The TPM v2.0 cryptographic chip can also be used to store cryptographic secrets like keys or certificates on the AgoraGateway 11.

In embodiments, AgoraCore 13 can embody an open and extensible software-based operating system which is operably connected to AgoraVision 17 for monitoring and control of the physical asset(s) operably coupled to the AgoraGateway 11. AgoraCore 13 is also operably coupled to the remote management system AgoraOps 19 for remote management of the AgoraGateway 11. AgoraCore 13 can provide for execution of one or more Edge Applications 15 on the AgoraGateway 11. Such Edge Applications 15 can be developed through an open software development kit, which is referred to as AgoraSDK.

In embodiments, AgoraCore 13 can provide open, modular, configurable, and extensible software-based middleware that executes on the AgoraGateway 11. In embodiments, AgoraCore 13 can support a containerized microservice-based architecture. This architecture enables extensibility into several distinct and different solutions for different environments and applications at the edge, while still using the same infrastructure components. In embodiments, AgoraCore 13 can be configured such that one or more Edge Applications(s) 15 can be embodied by a container. A container is a standard unit of software that packages up code and all its dependencies (such as runtime environment, system tools, system libraries and settings) so that the Edge Application runs quickly and reliably in the AgoraCore computing environment. The container isolates software from its environment and ensure that it works uniformly and reliably in the AgoraCore computing environment.

In embodiments, AgoraCore 13 can include the following service components:

Southbound service component: cooperates with the Southbound Services hardware interface of the AgoraGateway 11 to connect to one or more physical asset(s) at a facility (e.g., wellsite); this component can support several protocol services simultaneously to allow for data acquisition and communication with physical assets using different acquisition and communication protocols.

Northbound service component: cooperates with the Northbound Services hardware interface of the AgoraGateway 11 to communicate data between the AgoraGateway 11 and AgoraVision 17 or AgoraOps 19 as applicable, and possibly to existing SCADA systems in multiple protocols if necessary.

Infrastructure services component: operates to provide a mechanism for service orchestration, exchange of messages between services and data storage at the edge.

Supporting services component: operates to perform data aggregation, management and reporting and application specific edge-processing services.

In embodiments, AgoraCore 13 can be based on Microsoft Azure IoT Edge technology. This technology enables development, deployment and remote management of customized Edge Applications 15 that are embodied by containerized microservices that execute in conjunction with the middleware services of AgoraCore 13 on the AgoraGateway 11.

In embodiments, AgoraCore 13 can also be configured to manage security services including TPM-based authentication of the Edge Application(s) 15 and authorized local access through a local user interface.

In embodiments, the AgoraGateway 11 can be configured to provide for open edge data aggregation. Specifically, a facility (e.g., wellsite) will typically have equipment, sensors, and control devices from a variety of different original equipment manufacturers (or OEMs), and each OEM brings their own data collection device or gateway. The AgoraGateway 11 can be configured to interface to different OEM devices using a wired communication protocol or wireless communication protocol as described herein. In this manner, the AgoraGateway 11 can be configured to provide open edge data aggregation for the equipment, sensors, and control devices from a variety of different original equipment manufacturers at a facility (e.g., wellsite), thus displacing the need of multiple OEM gateway devices. Moreover, the AgoraGateway 11 can be configured to collect other data types such as video, acoustics, and vibration, which then can be analyzed in the same environment.

In embodiments, AgoraVision 17 can embody one or more cloud applications that provide oil and gas operator users with real-time visualization of data communicated from the AgoraGateway 11 (such as events or alarms or sensor data pertaining to one or more physical assets operably coupled to the AgoraGateway 11) as well as interpretation and analysis of such data in order to determine the best strategy for corrective action for the one or more physical assets operably coupled to the AgoraGateway 11, if need be. Commands that carry out such corrective action can be communicated from AgoraVision 17 to the AgoraGateway 11 and relayed (or translated) for communication to the appropriate physical asset(s) operably coupled to the AgoraGateway 11.

In embodiments, the Agora Platform can be configured in a distributed computing topology in which the information processing occurs both at the facility (e.g., wellsite) (by the Edge Application(s) 15 executing on the AgoraGateway 11) and remotely at AgoraVision 17 (by cloud application(s) executing in the cloud processing environment). This feature enables the extension of cloud-based domain-specific workflows and algorithms to the facility (e.g., wellsite).

In traditional approaches, there is no real-time processing of high-frequency data produced by the physical assets at a facility (e.g., wellsite), where such high-frequency data is produced at a sampling rate in the range of 5 KHz to 1 Hz. Moreover, the high cost of data transmission can prohibit communicating such high frequency data to a remote cloud computing environment. Therefore, most traditional systems communicate limited resolution and limited data to a remote cloud computing environment, thus limiting the insights that could be generated from the high frequency data. In embodiments, the AgoraGateway 11 can be configured with data processing capabilities that process high frequency data generated by one or more physical assets at a facility (e.g., wellsite). For example, such data processing capabilities can include data analytics, machine learning and/or artificial intelligence that detect and classify events that reflect operational state of the physical asset(s) at the facility (e.g., wellsite) based on the real-time data generated at the facility (e.g., wellsite). Data representing such events can characterize valuable insights as to the operational state of the physical asset(s) at the facility for surveillance and automation workflows at the facility (e.g., wellsite). Data can be communicated to AgoraVision 17 to generate appropriate alarms pertaining to the physical asset(s) at the edge facility (e.g., wellsite) as well as interpretation and analysis of the data in order to determine the best strategy for corrective action for operation of such physical asset(s), if need be. Commands that carry out such corrective action can be communicated from AgoraVision 17 to the AgoraGateway 11 and relayed (or translated) for communication to the appropriate facility devices operably coupled to the AgoraGateway 11.

Moreover, each OEM device at the facility (e.g., wellsite) typically employs different data types and commands. It becomes a challenge to integrate the data types and commands for the collection of OEM devices at a facility (e.g., wellsite) into a single data ecosystem suitable for processing and analysis. The AgoraGateway 11 can be configured to solve this problem by bringing data and insights generated at the facility from all OEM devices at the facility into a unified data processing ecosystem. This removes data duplicity and integration challenges. Such a data processing ecosystem can be proprietary or an open system selected by operators as suitable or appropriate.

Furthermore, traditional systems were built many decades ago, where the cybersecurity and asset protection were managed through isolation of the operational technology (OT) environment in the field. In embodiments, the AgoraGateway 11 can be configured with both hardware-based and software-based security measures that provide control access to the AgoraGateway 11 for monitoring and remote management of the AgoraGateway 11. Traditional systems required people to travel to the field and manually update the code of controllers or firmware of a sensor or software upgrade of the facility (wellsite) system, therefore limiting the ability to deploy innovative solutions and dynamic intelligence to the facility (wellsite). The AgoraGateway 11 can be configured to cooperate with the remote management system AgoraOps 19 to provide an over-the-air update (OTA) feature, which enables remote management of the components at the wellsite, including the physical asset(s), the AgoraGateway 11, AgoraCore 13 executing on the AgoraGateway 11, Edge Application(s) 15 executing on the AgoraGateway 11, and the security policies on the AgoraGateway 11. In embodiments, the over-the-air update (OTA) feature can provide for such management at scale, for example, including batch mode update of one or more of these edge components.

In embodiments, AgoraVision 17 can be configured to operate a data contextualization service component that manages a telemetry channel and a control channel with a respective AgoraGateway 11. Such data contextualization service component can also be responsible for establishing communication with, and processing data communication messages to and from the respective AgoraGateway 11.

In embodiments, AgoraVision 17 can be configured to store raw data and process data communicated to and from a respective AgoraGateway 11. Such stored data can be made available for application and domain specific workflow engines embodied by AgoraVision 17.

In embodiments, AgoraVision 17 can be configured to provide communication and storage of the physical asset data reliably with high availability and performance through a secure API gateway.

In embodiments, AgoraVision 17 can be configured to use HTTPS-based provisioning that allows the AgoraCore 13 component of the AgoraGateway 11 to securely connect to AgoraVision 17. Once the provisioning is successful, MQTT (with TLS enabled) can be used as a communication protocol for the telemetry channel and the control channel with the respective AgoraGateway 11.

In embodiments, AgoraVision 17 can be configured to implement various microservice components, including:
  data ingestion component: telemetry data is acquired by the gateway and transmitted to the cloud where the data is processed by the data ingestion component and stored as a time-series database;
  command component: conveys remote control commands from the cloud to the gateway which is then appropriated to the asset;
  configuration management component: There are multiple configuration parameters including alarm thresholds, data acquisition and transmission rate and modbus configuration to manage various devices and protocols;
  device catalog management component: This maintains device related configurations e.g. IDs, Protocols, groups, where a device is considered an asset connected to the gateway;
  data storage component: this includes time series database for storing the telemetry data, alarms and configuration data; and
  identity management component: This ensures only authorized services and end users have access to the device data.

In embodiments, AgoraVision 17 can be embodied by a proprietary or open system selected by operators as suitable or appropriate.

In embodiments, the remote management system AgoraOps 19 can be configured with edge device management services that provide field support for the components of one or more AgoraGateways 11 deployed at the facilities (e.g., wellsites). The remote management system AgoraOps 19 can be embodied by a cloud processing environment that provides a management channel that connects to a respective AgoraGateway 11.

In embodiments, the remote management system AgoraOps 19 can be configured to provide for remote management of the edge devices deployed at the facilities (e.g. wellsites) over the entire lifecycle of such devices at scale, from site surveying to securely installing the AgoraGateway 11 and providing ongoing maintenance in the field. Such edge device management can involve a number of management functions, such as:
  onboarding the AgoraGateway and/or the devices operably coupled thereto;
  decommissioning the AgoraGateway and/or the devices operably coupled thereto;
  monitoring the status of the AgoraGateway and/or the devices operably coupled thereto;
  remotely configuring the AgoraGateway and/or the devices operably coupled thereto;

remotely updating software/firmware of the AgoraGateway and/or the devices operably coupled thereto; and sending non-domain-specific commands (e.g., reboot, shutdown etc.) to the AgoraGateway and/or the devices operably coupled thereto.

These functions can involve customized microservices, such as i) secure provisioning of the AgoraGateway 11 with minimal human input, or no human input at all, utilizing TPM-based device identity; ii) remote device un-provisioning and credential revocation; iii) device status monitoring, health, connectivity, security, performance; iv) secure and over-the-air updates for the AgoraCore 13 and Edge Applications 15 that execute on the AgoraGateway 11; and v) logging and tracking of device interaction for audit and traceability.

In embodiments, the AgoraGateway 11 can be configured with a local user interface (UI) to support features such as device configuration, data visualization, etc. The local user interface can be accessed by connecting a mobile computing device to AgoraGateway 11 as shown in FIG. 1. For example, the mobile computing device can be operably coupled to the AgoraGateway 11 via a Southbound Services interface of the AgoraGateway 11 (e.g., Wi-Fi connection or Ethernet connection) as described herein. The mobile computing device can be a laptop computer, tablet, smart phone or other mobile computing device. To protect its privileged function, such local user interface can support user authentication for various deployment scenarios. The configuration of the AgoraGateway 11 can eliminate risk due to any unauthorized physical access by not storing any credentials either in plaintext or hashed form. User authentication can rely on existing secure IT servers or secure hardware tokens to store the secrets. In a reference implementation where the AgoraGateway 11 is connected to the Internet, user authentication can be performed using federation against one or more directories of authorized users. For disconnected scenarios where the AgoraGateway 11 is not connected to the Internet, user authentication can be performed using a secure hardware token that contains the user's public-private key.

In embodiments, AgoraCore 13 can be based on the Debian Linux operating system. The operating system can be hardened to ensure that it does not expose any unnecessary service or port to improve security. To achieve this, unnecessary services and ports are disabled. Furthermore, the AgoraGateway 11 can be configured such that it does not run any service for connection from external networks and only makes outbound connections to trusted domains. As such, there are no services that can be connected to exploit. Additionally, certain critical services such as device provisioning, software update, and device management can utilize runtime software that employs mutual authentication for strong security.

The remote management system AgoraOps 19 can be provided on a cloud computing environment (e.g., such as the Azure Cloud of Microsoft) with well-defined administrative controls. The cloud computing environment can be configured to enforce strong authentication for administrator accounts. For example, administrative account passwords can be managed by CyberArk privileged account management (PAM) solution that requires two factor authentications.

The remote management system AgoraOps 19 can be configured to act as a security broker to manage trust between other components of the Agora Platform, such as services of AgoraVision 17 that have no pre-configured trust with the AgoraGateway 11. As described above, the AgoraGateway 11 can use a TPM chip that enables the trust relationship with AgoraOps 19, which can be verified during provisioning. This method requires the public key of each AgoraGateway 11 to be pre-configured and stored by the remote management system AgoraOps 19.

Figure 2A:
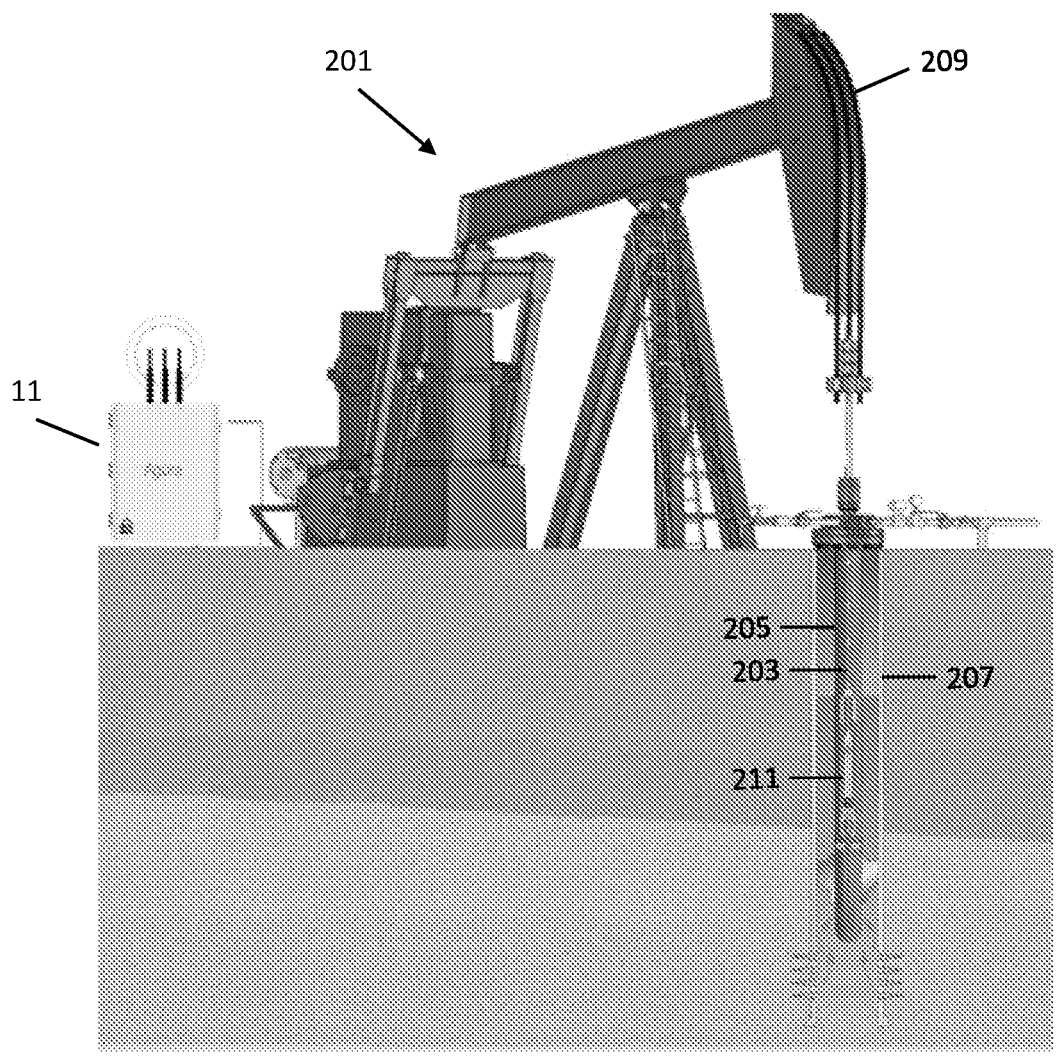
FIG. 2A is a schematic diagram of a rod pump system.
Figure 2B:
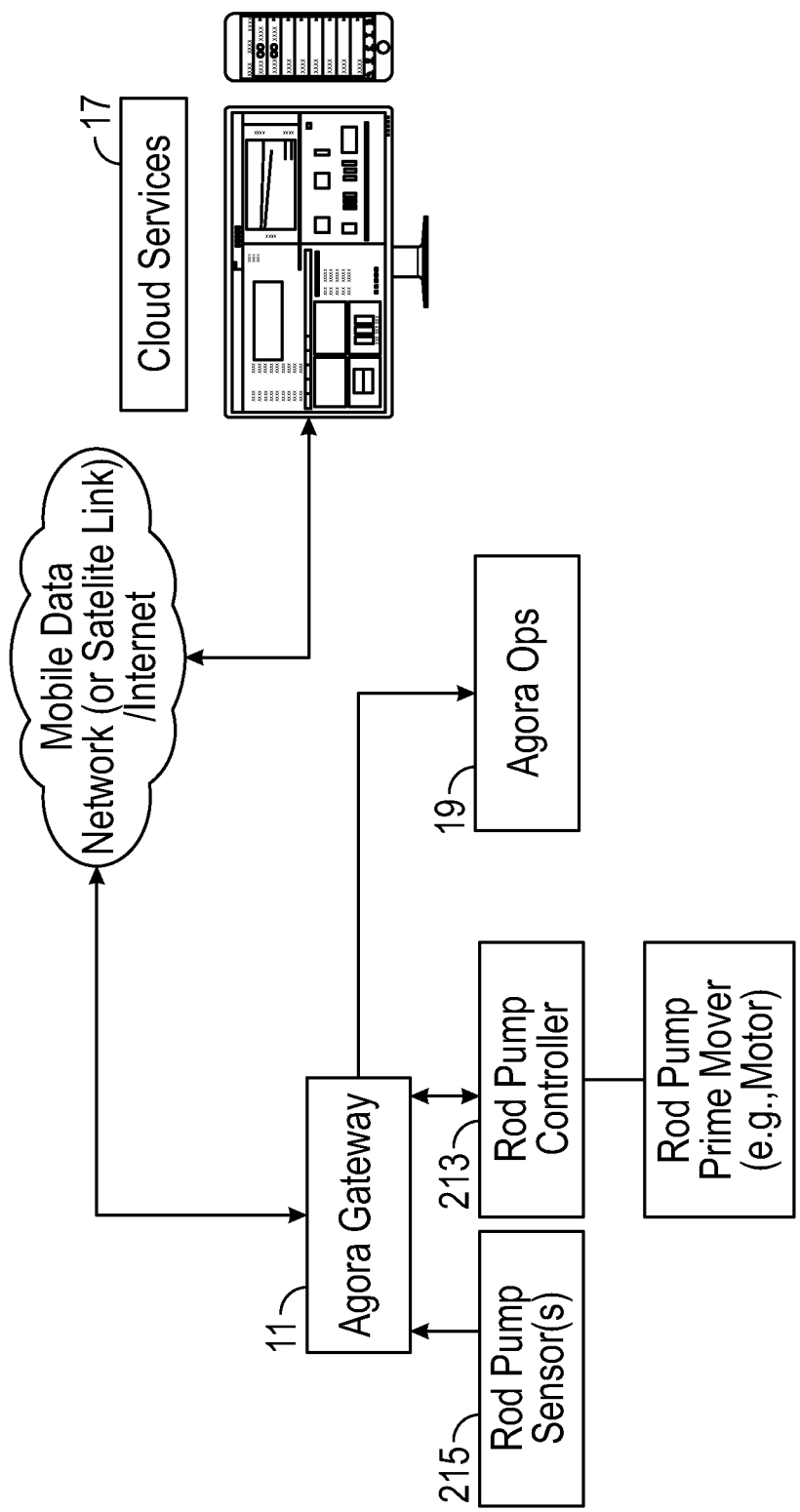
FIG. 2B is a schematic diagram of the distributed computing platform of FIG. 1 configured for operational surveillance, diagnostics, and optimization of the rod pump system of FIG. 2A.
Figure 2C:
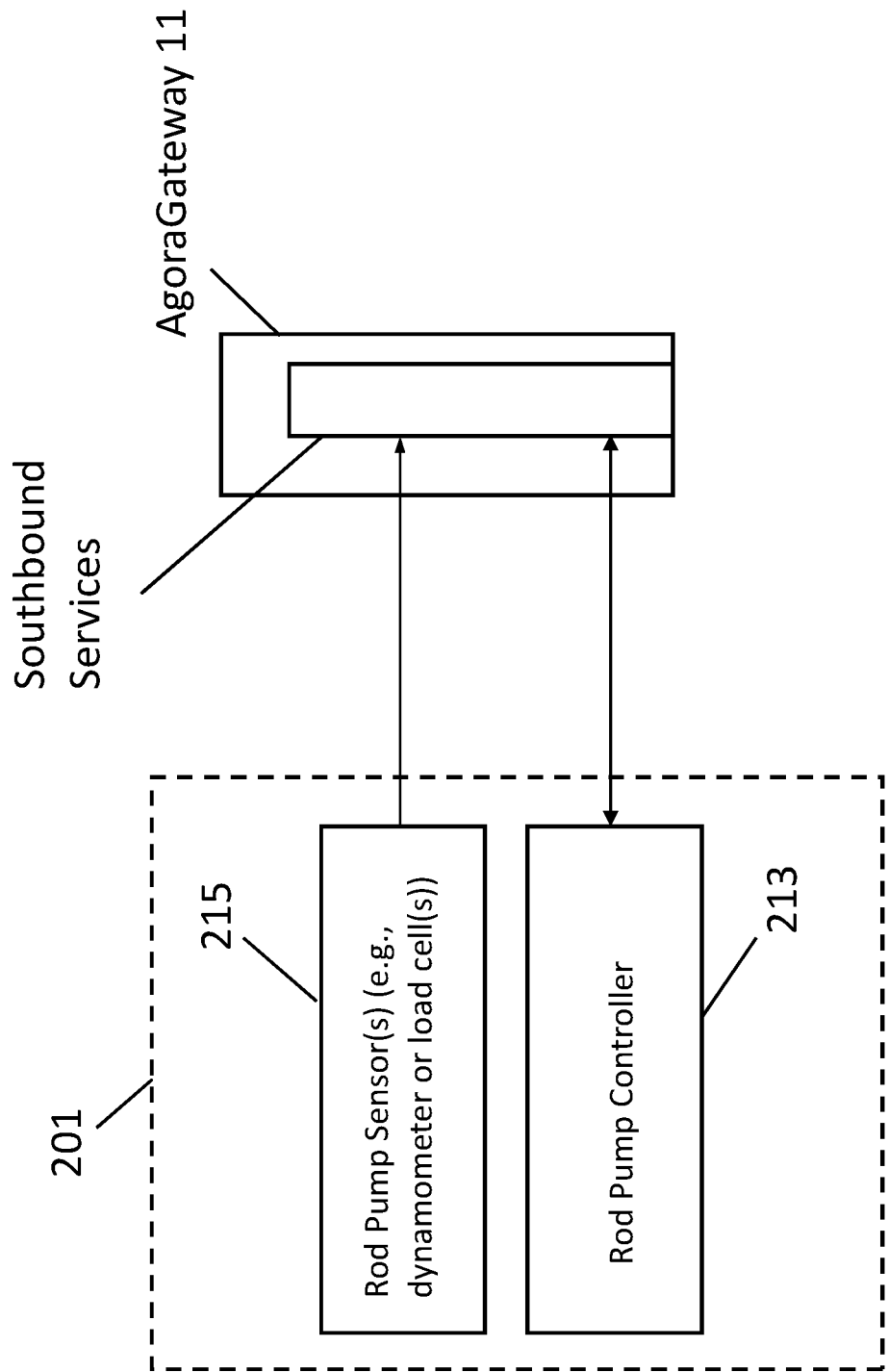
FIG. 2C is a schematic diagram that illustrates data communication interfaces between the gateway device and components of rod pump system of FIG. 2B.

In embodiments, the AgoraGateway 11 can be operably coupled to a rod pump system 201 at a wellsite as illustrated in FIGS. 2A-2C. The rod pump system 201 includes a number of interconnected rods which are referred to as a rod string 203 that extends from the surface down production tubing 205 within a cased vertical well 207. The rod string 203 is coupled to an actuating device 209 at the surface. A subsurface pump 211 is coupled to the rod string 203 at a desired location in the tubing 205/well 207. The actuating device 209 is embodied by a pump jack of the walking beam type which is coupled to the rod string by a rod hanger. The actuating device 209 imparts reciprocating motion to the rod string along the central axis of the tubing 204 which causes the pump 211 to capture and lift formation fluids to the surface. The actuating device 209 is driven by a prime mover, which is typically embodied by an electric motor or internal combustion engine. The prime mover typically delivers high-speed, low-torque rotational power to a gear reducer, which converts that rotational power into low-speed, high-torque rotational power supplied to the pump jack. The pump jack converts the rotational power output by the gear reducer into reciprocating motion that lifts and lowers the rod string 203 connected to the subsurface pump 211. The operation of the prime mover is typically controlled by a controller 213 (referred to herein as a rod pump controller) that is operably coupled to the prime mover. The rod pump controller 213 is typically embodied by a computer-based system or other electronic control device. The rod pump system 201 further includes one or more sensors 215 that are configured to gather information about one or more operational states of the rod pump system. The sensor(s) 215 can be a conventional load cell or dynamometer which measures the tensile load of the rod string 203. Alternatively or additionally, the sensor(s) 215 can include a shockwave-based system which measures fluid height in the cased wellbore 207. Alternatively or additionally, the sensor(s) 215 can include other sensor systems that measure motor current, voltage, and/or instant RPM to evaluate the operational conditions of the motor/prime mover of the system. Alternatively or additionally, the sensor(s) 215 can include other sensor systems that measure operational conditions of the subsurface pump 211, such as pump fillage, strokes/minute or other operational conditions of the subsurface pump 211. The rod pump controller 213 and the sensor(s) 215 of the rod pump system 201 can be supplied by a variety of different OEM vendors or providers and thus can vary across rod pump systems at different wellsites. The rod pump controller 213 and the sensor(s) 215 of the rod pump system 201 are operably coupled to the AgoraGateway 11 at the wellsite as illustrated in FIG. 2B. For example, the rod pump controller 213 and the sensor(s) 215 of the rod pump system 201 can be operably coupled to the AgoraGateway 11 via a Southbound Services interface of the AgoraGateway 11 as described herein and illustrated in FIG. 2C.

In this embodiment, one or more Edge Applications 15 that execute on the AgoraGateway 11 can be configured with data processing capabilities that acquire, aggregate and process high frequency data generated by the rod pump controller 213 and the sensor(s) 215 of the rod pump system 201 at the wellsite. For example, such data processing capabilities can include data analytics, machine learning and/or artificial intelligence that detect and classify events that reflect operational state of the rod pump system 201 at the wellsite based on the real-time data generated by the rod pump controller 213 and the sensor(s) 215 at the wellsite. Data representing such events can characterize valuable insights as to the operational state of the rod pump system 201 at the wellsite for surveillance and automation workflows at the wellsite. The Edge Application(s) 15 that execute on the AgoraGateway 11 can be further configured to communicate data from the AgoraGateway 11 to AgoraVision 17 to generate appropriate alarms pertaining to the operational state of the rod pump system 201 at the wellsite. The cloud applications executing on AgoraVision 17 can interact with operator users to provide notification or alerts pertaining to such alarms. For example, the alerts can be embodied by a pop-up display, email communication, SMS message, or other message-based communication. The cloud application executing on AgoraVision 17 can also interact with operator users to interpret and analyze the data in order to determine or recommend the best strategy for corrective action for operation of the rod pump system 201 at the wellsite, if need be. For example, such corrective actions can involve reducing or increasing the RPM of the motor/prime mover of the rod pump system 201 at the wellsite or possibly shutting down the motor/prime mover of the rod pump system 201 at the wellsite. Commands that carry out such corrective action can be communicated from AgoraVision 17 to the AgoraGateway 11 and relayed (or translated) for communication to the rod pump controller 213 operably coupled to the AgoraGateway 11.

Note that the architecture of FIG. 2B illustrates an AgoraGateway 11 and rod pump system 201 at a single wellsite for simplicity of description. In most applications, the AgoraGateway and rod pump system can be installed as pairs at multiple wellsites where the respective AgoraGateway devices communicate with AgoraVision 17 and the remote management system AgoraOps 19 as described herein for surveillance and control of the rod pump systems at the multiple wellsites.

Figure 3A:
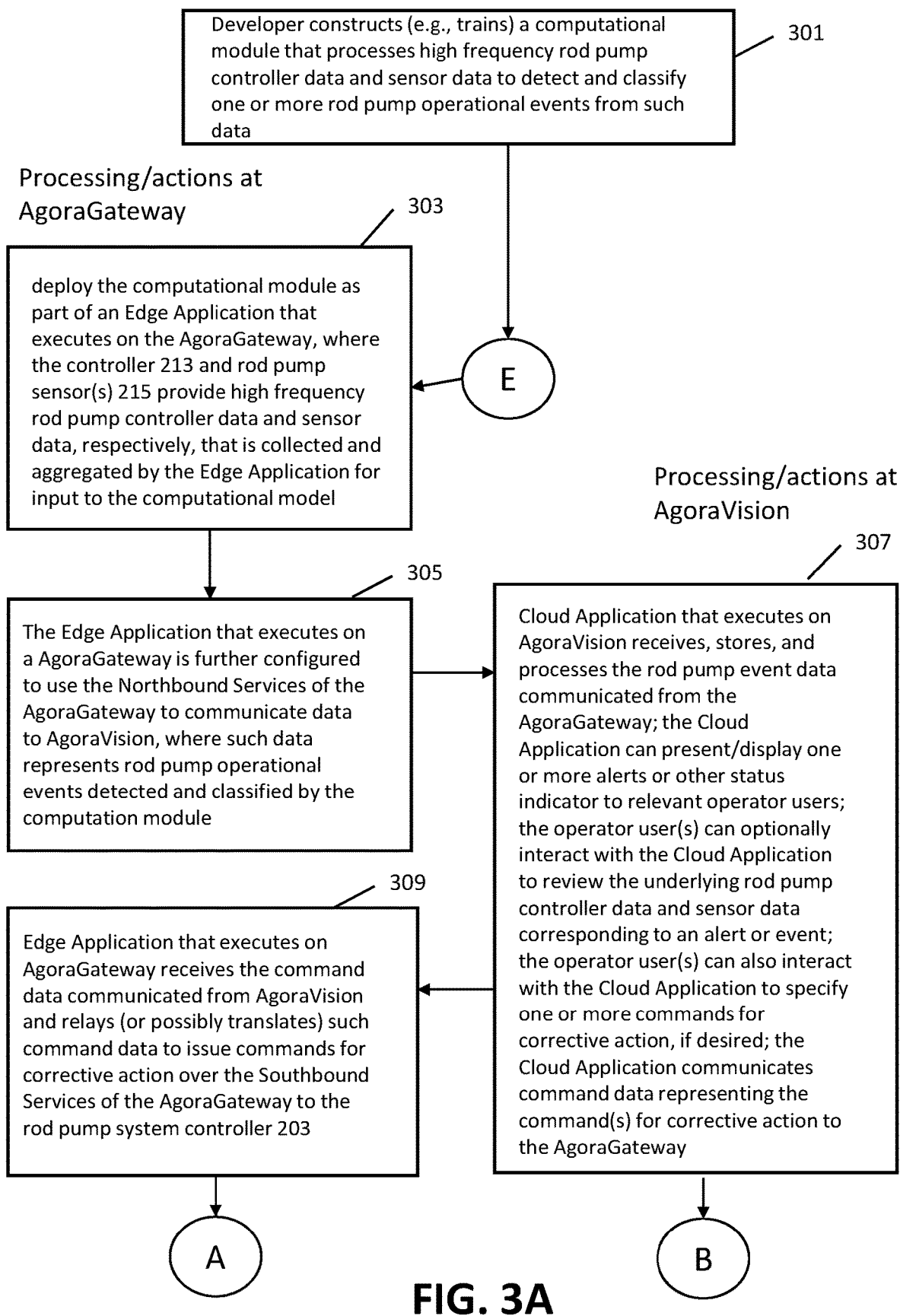
FIGS. 3A-3C, collectively, is a flowchart of a workflow that employs the distributed computing platform of FIG. 2B for operational surveillance, diagnostics, and optimization of the rod pump system of FIG. 2A.
Figure 3B:
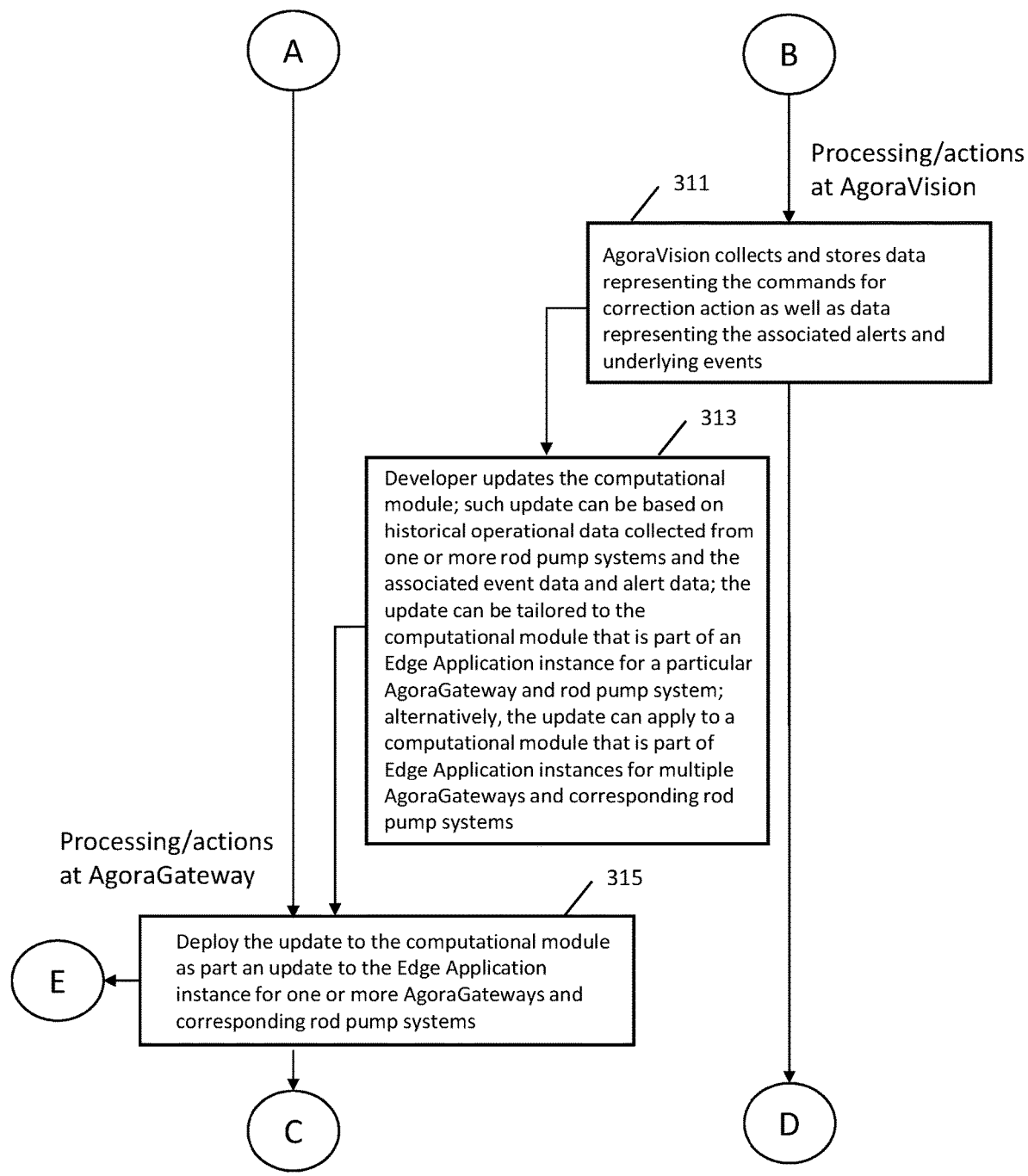
Figure 3C:
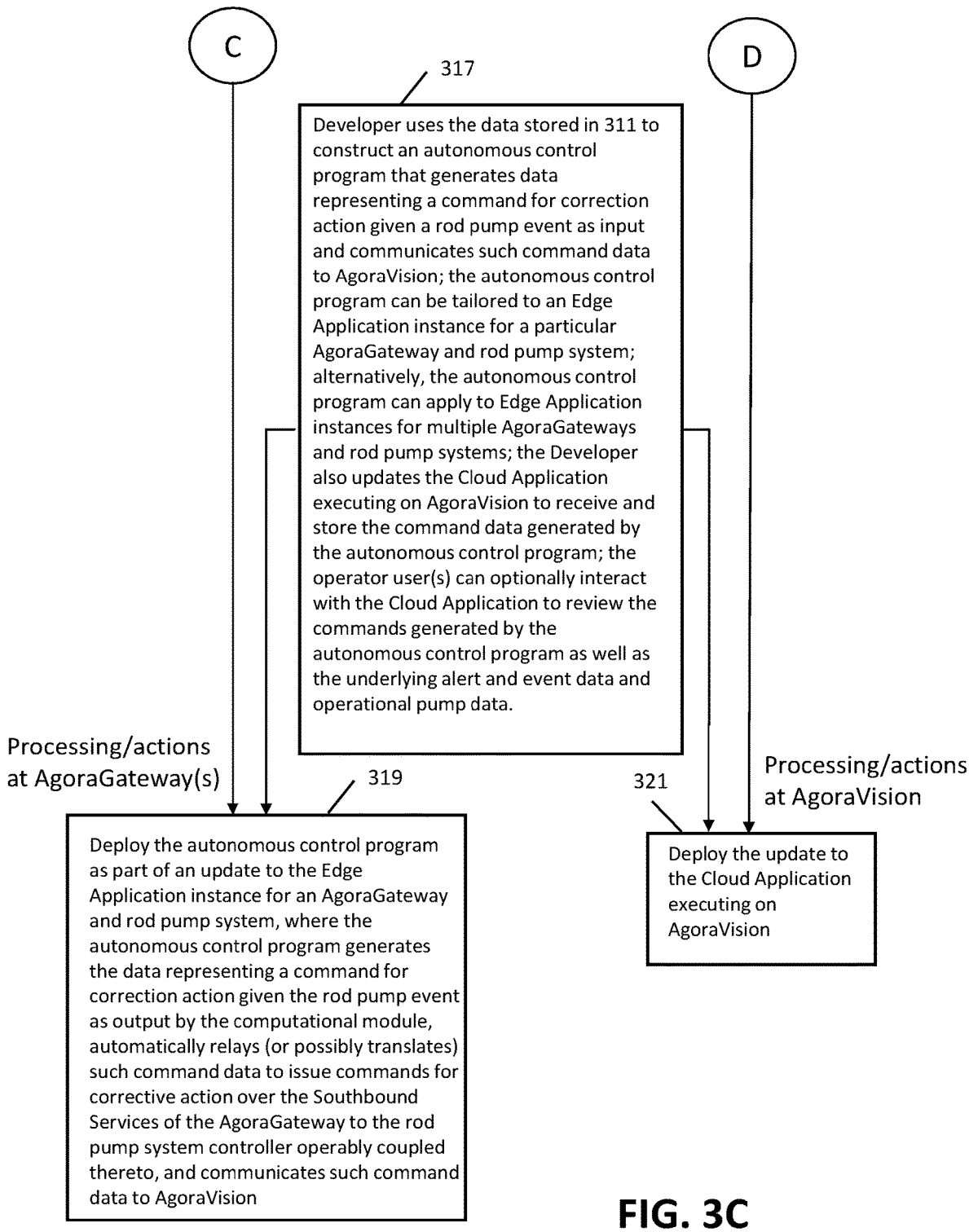

FIGS. 3A-3C depict a workflow that is carried out by the Agora Platform of FIGS. 2A-2C for surveillance and automated control of the rod pump system 201 at the wellsite. This workflow can be applied to multiple wellsites to allow for surveillance and control of the rod pump systems at multiple wellsites as needed.

The operations begin in block 301 where a developer constructs a computational module that processes high frequency rod pump controller data and sensor data (e.g., generated by, or derived from data generated by, the rod pump controller 213 and the sensor(s) 215 at a wellsite) to detect and classify one or more rod pump operational events from such data. The developer can be affiliated with the service provider that maintains the Agora Platform. Alternatively, the developer can be independent and unaffiliated with the service provider that maintains the Agora Platform supplier. In this case, the computation module can be tested by the platform service provider and/or the end user for the oilfield operating company to ensure performance and reliability. The computational module can involve data analytics, machine learning and/or artificial intelligence that detect and classify events that reflect operational state of the rod pump system at the wellsite based on the real-time data generated by the rod pump controller and the sensor(s) at the wellsite. The computational module can output data representing such events. Such data can characterize valuable insights as to the operational state of the rod pump system at the wellsite. For example, such data can characterize anomalies or failures of the rod pump system such as threshold breach, multiparameter relationship-based alerts, shutdown alerts, communication loss alerts, and pump efficiency degradation alerts.

In embodiments, the computational module can embody data analytics, machine learning and/or artificial intelligence. For example, the computational module can employ real-time data stream analytics to analyze the changing behavior of the high frequency data generated by the rod pump controller and the sensor(s) at the wellsite. Such data stream analytics can be configured to process a stream or batch of high frequency data generated by the rod pump controller and the sensor(s) at the wellsite and acquired by the AgoraGateway device over a sampling period to detect and/or predict operational events, such as anomalies or failures of the rod pump system, from the high frequency rod pump controller data and sensor data generated at the wellsite. In embodiments, the data stream analytics can be configured to perform multivariate anomaly detection of anomalies or failures of the rod pump system from the high frequency rod pump controller data and sensor data generated at the wellsite.

In block 303, the computational module of block 301 is deployed as part of an Edge Application 15 that executes on the AgoraGateway 11, where the controller 213 and rod pump sensor(s) 215, operably coupled to the AgoraGateway 11, provide high frequency rod pump controller data and sensor data, respectively, that is collected and aggregated by the Edge Application 15 for input to the computational module. The computational module is configured to detect and classify one or more rod pump operational events from the high frequency rod pump controller data and sensor data generated at the wellsite and supplied to the computational module by execution of the Edge Application 15. The installation of the Edge Application 15 on the AgoraGateway 11, including the deployment of computational module of block 301 as part of the Edge Application 15, can be carried out prior to installation of the AgoraGateway 11 at the wellsite, locally at the wellsite when installing the AgoraGateway 11 at the wellsite, or remotely by the remote management services of the AgoraOps system 19. In embodiments, such remote management services can involve over the air update/software patching functionality of the AgoraOps system 19 as described herein.

In block 305, the Edge Application 15 that executes on the AgoraGateway 11 is further configured to use the Northbound Services of the AgoraGateway 11 to communicate data to AgoraVision 17, where such data represents rod pump operational events detected and classified by the computation module as described herein.

In block 307, the cloud application that executes on AgoraVision 17 receives, stores, and processes the rod pump event data communicated from the AgoraGateway 11 The cloud application can be configured to present/display one or more alerts or other status indicators corresponding to the event data to one or more relevant operator users. The operator user(s) can optionally interact with the cloud application to review the underlying rod pump controller data and sensor data corresponding to an alert or event. The operator user(s) can also interact with the cloud application to specify one or more commands for corrective action, if desired. The cloud application that executes on AgoraVision 17 is further configured to communicate command data representing the command(s) for corrective action to the appropriate AgoraGateway 11 (which is that AgoraGateway 11 that communicated the rod pump event data that triggered the correction action).

In block 309, the Edge Application 15 that executes on the AgoraGateway 11 receives the command data communicated from Agora Vision 17 and relays (or possibly translates) such command data to issue one or more commands for corrective action over the Southbound Services of the AgoraGateway 11 to the rod pump controller 213 operably coupled thereto. For example, such corrective actions can involve reducing or increasing the RPM of the motor/prime mover of the rod pump system 201 at the wellsite or possibly shutting down the motor/prime mover of the rod pump system 201 at the wellsite.

In block 311, AgoraVision 17 is configured to collect and store data representing the commands for correction action as well as data representing the associated alerts and underlying events as processed in blocks 305 and 307.

In block 313, the developer updates the computational module that is part of the Edge Application 15. Such updates can be based on historical operational data collected from one or more rod pump systems and the associated event data and alert data. For example, the update can be based on training (such as supervised learning training) that employs historical operational data collected from one or more rod pump systems and the associated event data and alert data. In embodiments, the update to the computational module can be tailored to the computational module that is part of an Edge Application instance for a particular AgoraGateway 11 and rod pump system. Alternatively, the update to the computational module can apply to a computational module that is part of Edge Application instances for multiple AgoraGateways and corresponding rod pump systems.

In block 315, the update to the computational module of block 313 is deployed as part of an update to the Edge Application instance for the AgoraGateway and rod pump system for use in block 303 of the workflow. The deployment of the update to the computational module of block 313 as part of the Edge Application instance can be carried remotely by the remote management services of the AgoraOps system 19. In embodiments, such remote management services can involve over the air update/software patching functionality of the AgoraOps system 19 as described herein.

In block 317, a developer uses the data stored in 311 to construct an autonomous control program that generates data representing a command for correction action given a rod pump event as input and communicates such command data to AgoraVision. The developer can be affiliated with the service provider that maintains the Agora Platform. Alternatively, the developer can be independent and unaffiliated with the service provider that maintains the Agora Platform supplier. In this case, the autonomous control program can be tested by the platform service provider and/or the end user for the oilfield operating company to ensure performance and reliability. In one embodiment, the autonomous control program can be tailored to an Edge Application instance for a particular AgoraGateway and rod pump system operably coupled thereto. For example, the autonomous control program can employ one or more set points, threshold limits or other control parameters that are tailored to an Edge Application instance for a particular AgoraGateway and rod pump system operably coupled thereto. Alternatively, the autonomous control program can apply to Edge Application instances for multiple AgoraGateways and corresponding rod pump systems.

In block 317, the Developer also updates the cloud application executing on AgoraVision 17 to receive and store the command data generated by the autonomous control program as part of the Edge Application 15 executing on one or more AgoraGateways 11. The update to the cloud application can optionally allow operator user(s) to interact with the cloud application to review the commands generated by the autonomous control program as well as the underlying alert and event data and operational pump data.

In block 319, the autonomous control program of block 317 is deployed as part of an update to the Edge Application instance for an AgoraGateway and rod pump system, where the autonomous control program generates the data representing a command for correction action given the rod pump event as output by the computational module. The Edge Application instance is further configured to automatically relay (or possibly translate) such command data to issue commands for corrective action over the Southbound Services of the AgoraGateway to the rod pump controller 213 (without human involvement) operably coupled thereto, and communicate such command data to Agora Vision 17. The deployment of the autonomous control program and configuration of the Edge Application instance can be carried remotely by the remote management services of the AgoraOps system 19. In embodiments, such remote management services can involve over the air update/software patching functionality of the AgoraOps system 19 as described herein.

In block 321, the update to the cloud application executing on AgoraVision 17 of block 317 is deployed such that the cloud application executing on AgoraVision 17 is configured to receive and store the command data generated by the autonomous control program as part of the Edge Application 15 executing on one or more AgoraGateways 11. The update to the cloud application can optionally allow operator user(s) to interact with the cloud application to review the commands generated by the autonomous control program as well as the underlying alert and event data and operational pump data. The deployment of the update to the cloud application executing on AgoraVision 17 can be carried remotely by the remote management services of the AgoraOps system 19. In embodiments, such remote management services can involve over the air update/software patching functionality of the AgoraOps system 19 as described herein.

In embodiments, AgoraVision 17 can be configured to provide a ticket-based task management system where certain tasks, such as reviewing a particular alert pertaining to the rod lift system at a wellsite and/or specifying corrective action in response to a particular alert, are assigned to a given operator user. The tasks assigned to the given operator user are communicated to the given operator user. For example, the communication of such tasks can be embodied by a pop-up display, email communication, SMS message or other message-based communication addressed or otherwise directed to the given operator user. AgoraVision 17 can also be configured to record completion of the tasks by the assigned operator users as well as date and time of completion for record keeping purposes.

Figure 4:
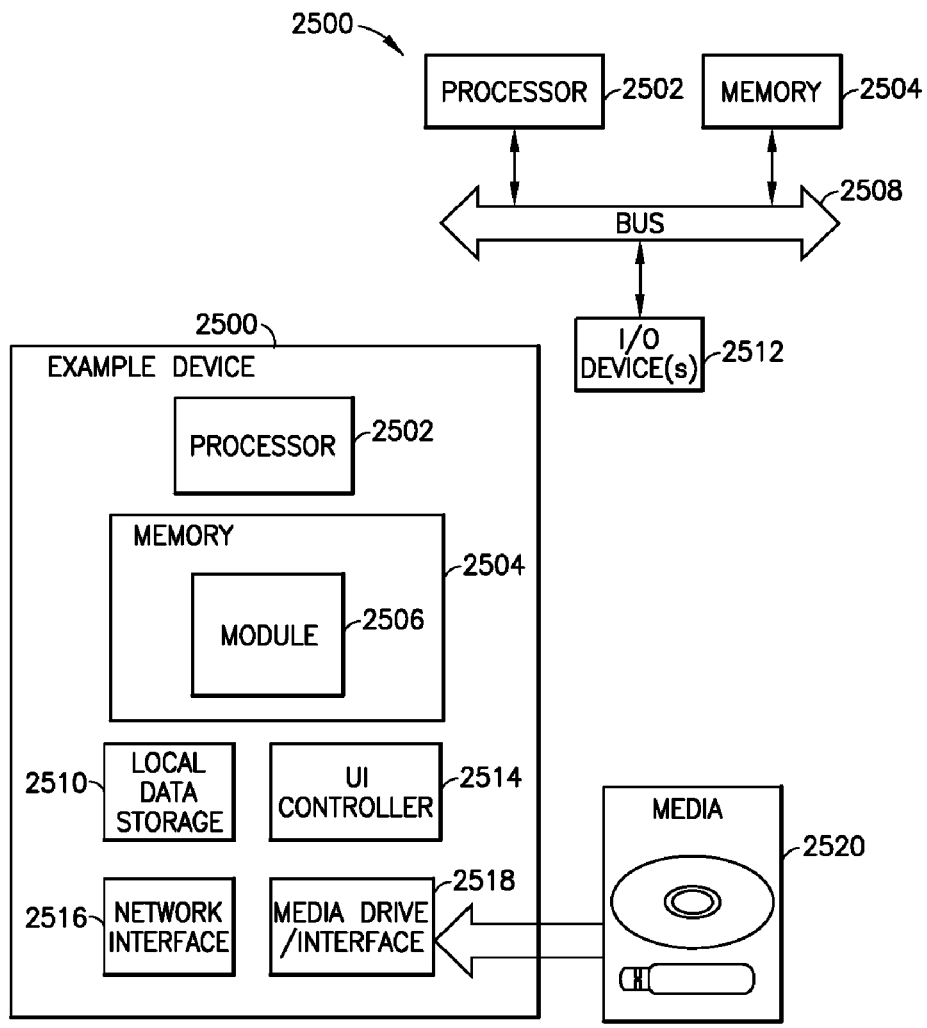
FIG. 4 is functional block diagram of a computer processing system.

FIG. 4 illustrates an example device 2500, with a processor 2502 and memory 2504 that can be configured to implement various embodiments of the platform components (such as the AgoraGateway 11, AgoraVision 17 and the remote management system AgoraOps 19), methods and workflows as discussed in the present application. Memory 2504 can also host one or more databases and can include one or more forms of volatile data storage media such as random-access memory (RAM), and/or one or more forms of nonvolatile storage media (such as read-only memory (ROM), flash memory, and so forth).

Device 2500 is one example of a computing device or programmable device and is not intended to suggest any limitation as to scope of use or functionality of device 2500 and/or its possible architectures. For example, device 2500 can comprise one or more computing devices, programmable logic controllers (PLCs), etc.

Further, device 2500 should not be interpreted as having any dependency relating to one or a combination of components illustrated in device 2500. For example, device 2500 may include one or more of computers, such as a laptop computer, a desktop computer, a mainframe computer, etc., or any combination or accumulation thereof.

Device 2500 can also include a bus 2508 configured to allow various components and devices, such as processors 2502, memory 2504, and local data storage 2510, among other components, to communicate with each other.

Bus 2508 can include one or more of any of several types of bus structures, including a memory bus or memory controller, a peripheral bus, an accelerated graphics port, and a processor or local bus using any of a variety of bus architectures. Bus 2508 can also include wired and/or wireless buses.

Local data storage 2510 can include fixed media (e.g., RAM, ROM, a fixed hard drive, etc.) as well as removable media (e.g., a flash memory drive, a removable hard drive, optical disks, magnetic disks, and so forth). One or more input/output (I/O) device(s) 2512 may also communicate via a user interface (UI) controller 2514, which may connect with I/O device(s) 2512 either directly or through bus 2508.

In one possible implementation, a network interface 2516 may communicate outside of device 2500 via a connected network. A media drive/interface 2518 can accept removable tangible media 2520, such as flash drives, optical disks, removable hard drives, software products, etc. In one possible implementation, logic, computing instructions, and/or software programs comprising elements of module 2506 may reside on removable media 2520 readable by media drive/interface 2518.

In one possible embodiment, input/output device(s) 2512 can allow a user (such as a human annotator) to enter commands and information to device 2500, and also allow information to be presented to the user and/or other components or devices. Examples of input device(s) 2512 include, for example, sensors, a keyboard, a cursor control device (e.g., a mouse), a microphone, a scanner, and any other input devices known in the art. Examples of output devices include a display device (e.g., a monitor or projector), speakers, a printer, a network card, and so on.

Various systems and processes of present disclosure may be described herein in the general context of software or program modules, or the techniques and modules may be implemented in pure computing hardware. Software generally includes routines, programs, objects, components, data structures, and so forth that perform particular tasks or implement particular abstract data types. An implementation of these modules and techniques may be stored on or transmitted across some form of tangible computer-readable media. Computer-readable media can be any available data storage medium or media that is tangible and can be accessed by a computing device. Computer readable media may thus comprise computer storage media. "Computer storage media" designates tangible media, and includes volatile and nonvolatile, removable, and non-removable tangible media implemented for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible medium which can be used to store the desired information, and which can be accessed by a computer. Some of the methods and processes described above, can be performed by a processor. The term "processor" should not be construed to limit the embodiments disclosed herein to any particular device type or system. The processor may include a computer system. The computer system may also include a computer processor (e.g., a microprocessor, microcontroller, digital signal processor, general-purpose computer, special-purpose machine, virtual machine, software container, or appliance) for executing any of the methods and processes described above.

The computer system may further include a memory such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device.

Some of the methods and processes described above, can be implemented as computer program logic for use with the computer processor. The computer program logic may be embodied in various forms, including a source code form or a computer executable form. Source code may include a series of computer program instructions in a variety of programming languages (e.g., an object code, an assembly language, or a high-level language such as C, C++, or JAVA). Such computer instructions can be stored in a non-transitory computer readable medium (e.g., memory) and executed by the computer processor. The computer instructions may be distributed in any form as a removable storage medium with accompanying printed or electronic documentation (e.g., shrink wrapped software), preloaded with a computer system (e.g., on system ROM or fixed disk), or distributed from a server or electronic bulletin board over a communication system (e.g., the Internet or World Wide Web).

Alternatively or additionally, the processor may include discrete electronic components coupled to a printed circuit board, integrated circuitry (e.g., Application Specific Integrated Circuits (ASIC)), and/or programmable logic devices (e.g., a Field Programmable Gate Arrays (FPGA)). Any of the methods and processes described above can be implemented using such logic devices.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

There have been described and illustrated herein several embodiments of a distributed processing platform and related workflows that acquire, aggregate and process high frequency data generated by artificial lift equipment at a wellsite. Such data processing capabilities can include data analytics, machine learning and/or artificial intelligence that detect and classify events that reflect operational state of the artificial lift system at the wellsite based on the real-time data generated at the wellsite. Data representing such events can characterize valuable insights as to the operational state of the artificial lift system for surveillance and automation workflows at the wellsite. While particular embodiments of the invention have been described, it is not intended that the invention be limited thereto, as it is intended that the invention be as broad in scope as the art will allow and that the specification be read likewise. Thus, while particular system components and workflows have been disclosed for rod pump systems, it will be appreciated that such system components and workflows can be used for other artificial lift systems as well. It will therefore be appreciated by those skilled in the art that yet other modifications could be made to the provided invention without deviating from its spirit and scope as claimed.

What is claimed is:

1. A system for monitoring and/or controlling operations of an artificial lift system of a production well, the system comprising:
    a gateway device disposed at a wellsite corresponding to the well; and
    at least one cloud-computing system disposed remotely from the wellsite and operably coupled to the gateway device;
    wherein the gateway device comprises at least one first interface that is operably coupled to the artificial lift system, at least one second interface that is operably coupled to the at least one cloud-computing system, and a processor configured to execute a first application that acquires data produced by a rod pump controller and at least one sensor of the artificial lift system and communicated to the gateway device via the at least one first interface, wherein the first application includes a computational module that processes the acquired data produced by the rod pump controller and the at least one sensor of the artificial lift system to detect and classify operational events from said data as anomalies or failures of the artificial lift system;
    wherein the gateway device is configured to transmit command data to reduce revolutions per minute of a motor of the artificial lift system or a prime mover of the artificial lift system, increase revolutions per minute of the motor of the artificial lift system or the prime mover of the artificial lift system, shut down the motor of the artificial lift system, or shut down the motor of the artificial lift system for a given operational event;
    wherein the gateway device is further configured to transmit the command data to the artificial lift system via the first interface of the gateway device; and
    wherein the at least one cloud-computing system is configured to execute a second application that receives event data communicated from the gateway device, wherein said event data characterizes the operational events detected and classified by the computational module, wherein said event data is stored and accessed by authorized users of the cloud-computing system for remote surveillance of operation of the artificial lift system at the wellsite.

2. A system according to claim 1, wherein:
    the at least one cloud-computing system includes a system operably coupled to the gateway device by at least one secure communication channel to provide for remote management of the gateway device.

3. A system according to claim 2, wherein:
    the remote management of the gateway device comprises a number of management functions selected from the group including: onboarding the gateway device and one or more devices operably coupled thereto, decommissioning the gateway device and one or more devices operably coupled thereto, monitoring status of the gateway device and one or more devices operably coupled thereto, remotely configuring the gateway device and one or more devices operably coupled thereto, remotely updating software/firmware of the gateway device and one or more devices operably coupled thereto; and sending commands to the gateway device and one or more devices operably coupled thereto.

4. A system according to claim 2, wherein:
    the remote management of the gateway device comprises secure provisioning of the gateway device utilizing a trusted platform chip that is part of the gateway device.

5. A system according to claim 2, wherein:
    the remote management of the gateway device comprises secure over-the-air update of software or firmware of the gateway device.

6. A system according to claim 2, wherein:
    the remote management of the gateway device comprises secure over-the-air update of operating system software and application software of the gateway device.

7. A system according to claim 2, wherein:
    the remote management of the gateway device comprises secure over-the-air update for installation or update of the first application on the gateway device.

8. A system according to claim 2, wherein:
    the remote management of the gateway device comprises secure over-the-air update of the computational module, wherein the update of the computational module is based on historical operational data.

9. A system according to claim 1, wherein:
    the second application that executes on the at least one cloud-computing system is further configured to present or display an alert corresponding to the event data.

10. A system according to claim 9, wherein:
    the second application that executes on the at least one cloud-computing system is further configured to enable user interaction that specifies at least one command for corrective action in response to the alert and communication of command data representing said at least one command to the gateway device; and
    the first application of the gateway device is further configured to receive said command data and relay or translate said command data for supply to the artificial lift system via the first interface of the gateway device.

11. A system according to claim 1, wherein:
    the first application of the gateway device is further configured to include an autonomous control program, wherein the autonomous control program generates without human involvement command data representing a command for corrective action given an operational event as output by the computational module, relays or translates said command data for supply to the artificial lift system via the first interface of the gateway device, and communicates said command data to the at least one cloud-computing system via the at least one second interface of the gateway device.

12. A system according to claim 11, wherein:
    the at least one cloud-computing system includes a system that is operably coupled to the gateway device by at least one secure communication channel therebetween to provide for remote management of the gateway device, wherein the remote management of the gateway device comprises secure over-the-air update for installation or update of the autonomous control program as part of the first application on the gateway device.

13. A system according to claim 11, wherein:
the second application that executes on the at least one cloud-computing system is further configured to allow user review of the commands generated by the autonomous control program and optionally review underlying alert and event data and operational data.

14. A system according to claim 1, wherein:
the computational module embodies data analytics, machine learning and/or artificial intelligence.

15. A system according to claim 1, wherein:
the computational module employs real-time data stream analytics to analyze changing behavior of data generated by the artificial lift system at the wellsite.

16. A system according to claim 15, wherein:
said data stream analytics is configured to process a stream or batch of data generated by the artificial lift system over a sampling period to detect and/or predict operational events from the data.

17. A system according to claim 15, wherein:
said data stream analytics is configured to perform multivariate anomaly detection of anomalies or failures of the artificial lift system from the data.

18. A system according to claim 1, wherein:
the at least one first interface comprises at least one wired communication interface and at least one wireless communication interface.

19. A system according to claim 1, wherein:
the at least one second interface comprises at least one of a cellular data communication interface and a satellite data communication interface.

20. A system according to claim 1, wherein:
the artificial lift system comprises a rod pump system that includes a controller and at least one sensor disposed at the wellsite; and
the data includes data produced by the controller and the at least one sensor of the rod pump system.

21. A system according to claim 20, wherein:
the at least one sensor comprises a load cell or dynamometer which measures rod string tensile loading of the rod pump system.

22. A method for monitoring and/or controlling operations of an artificial lift system of a production well, the method comprising:
providing a gateway device disposed at a wellsite corresponding to the well and at least one cloud-computing system disposed remotely from the wellsite and operably coupled to a gateway device, wherein the gateway device includes at least one first interface that is operably coupled to the artificial lift system, at least one second interface that is operably coupled to the at least one cloud-computing system, and a processor;
configuring the processor of the gateway device to execute a first application that acquires data produced by a rod pump controller and at least one sensor of the artificial lift system and communicated to the gateway device via the at least one first interface, wherein the first application includes a computational module that processes said acquired data produced by the rod pump controller and the at least one sensor of the artificial lift system to detect and classify operational events as anomalies or failures of the artificial lift system from said data;
configuring the gateway device to transmit command data to reduce revolutions per minute of a motor of the artificial lift system or a prime mover of the artificial lift system, increase revolutions per minute of the motor of the artificial lift system or the prime mover of the artificial lift system, shut down the motor of the artificial lift system, or shut down the motor of the artificial lift system for a given operational event;
configuring the gateway device to transmit the command data to the artificial lift system via the first interface of the gateway device; and
configuring the at least one cloud-computing system to execute a second application that receives event data communicated from the gateway device, wherein said event data characterizes the operational events detected and classified by the computational module, wherein said event data is stored and accessed by authorized users of the cloud-computing system for remote surveillance of operation of the artificial lift system at the wellsite.

23. A method according to claim 22, further comprising:
providing a cloud-computing system operably coupled to the gateway device by at least one secure communication channel to provide for remote management of the gateway device.

* * * * *